ates Patent [19]

United States Patent [19]

Scholin et al.

[11] 4,030,385
[45] June 21, 1977

[54] WASHER CUTTING MACHINE
[75] Inventors: Harold W. Scholin, Park Ridge; Hieronim L. Lisiecke, Chicago, both of Ill.
[73] Assignee: Scholin Industries, Inc., Chicago, Ill.
[22] Filed: Dec. 15, 1975
[21] Appl. No.: 640,636
[52] U.S. Cl. .................................. 82/48; 82/101; 82/102
[51] Int. Cl.² ...................... B23B 7/00; B23B 3/04
[58] Field of Search ............ 82/46, 47, 48, 89, 101, 82/102, 86

[56] References Cited
UNITED STATES PATENTS

| | | | |
|---|---|---|---|
| 1,322,843 | 11/1919 | Townsend | 82/47 |
| 1,685,127 | 9/1928 | Hammond et al. | 82/89 |
| 1,986,587 | 1/1935 | Ludington | 82/47 |
| 2,186,583 | 1/1940 | Groh | 82/48 |
| 2,521,003 | 9/1950 | Gitter | 82/101 |
| 3,185,005 | 5/1965 | Judetson | 82/48 |
| 3,335,624 | 8/1967 | Cline | 82/48 X |
| 3,545,321 | 12/1970 | Phelps et al. | 82/47 |
| 3,861,253 | 1/1975 | Witcraft et al. | 82/48 |
| 3,911,768 | 10/1975 | Kawano | 82/86 |

*Primary Examiner*—Harrison L. Hinson
*Attorney, Agent, or Firm*—Johnson, Dienner, Emrich & Wagner

[57] ABSTRACT

A washer cutting machine is disclosed wherein a sleeve of an elastomeric material suitable for use as a washer is placed on a mandrel and rotated. A predetermined length of the sleeve extends beyond the end of the mandrel, and a knife-edge moves in a radial direction to cut a ring from the end of the sleeve of a width such that it may be suitable for use as a washer. The machine is programmed so that the steps of loading the sleeve on the mandrel, cutting a washer from the sleeve, advancing the sleeve the width of a washer to be cut at the completion of each cutting operation, and stopping operation of the machine after the last washer has been cut therefrom, are all carried out automatically.

14 Claims, 8 Drawing Figures

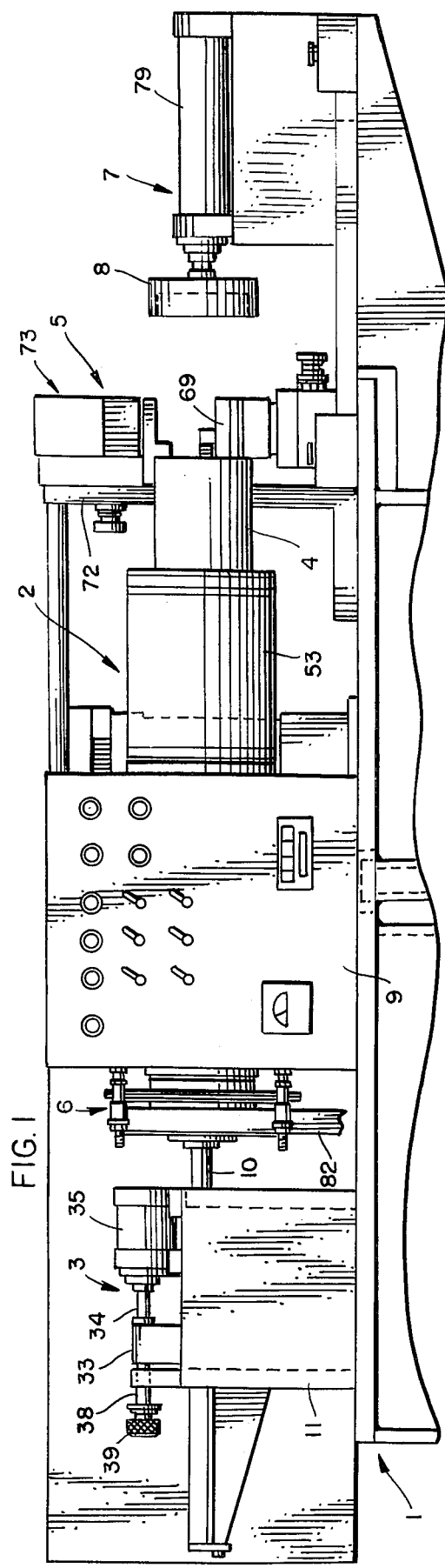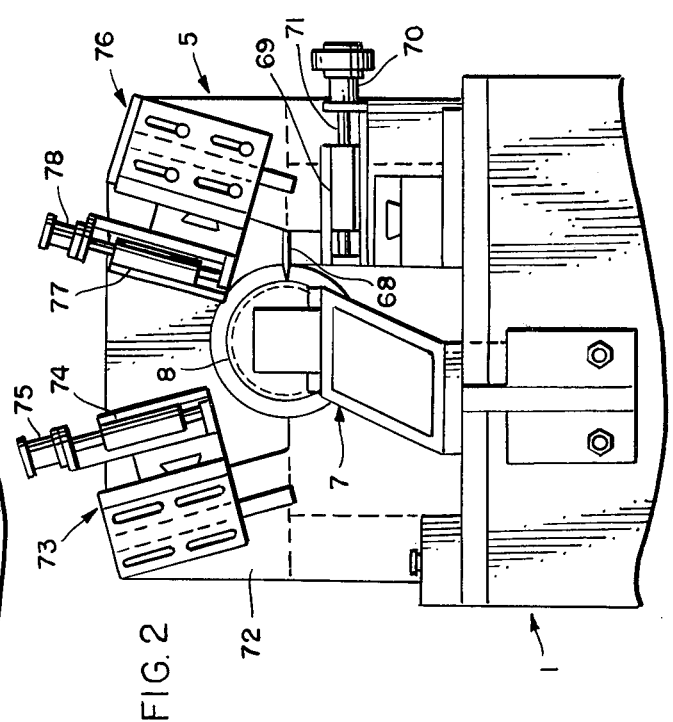

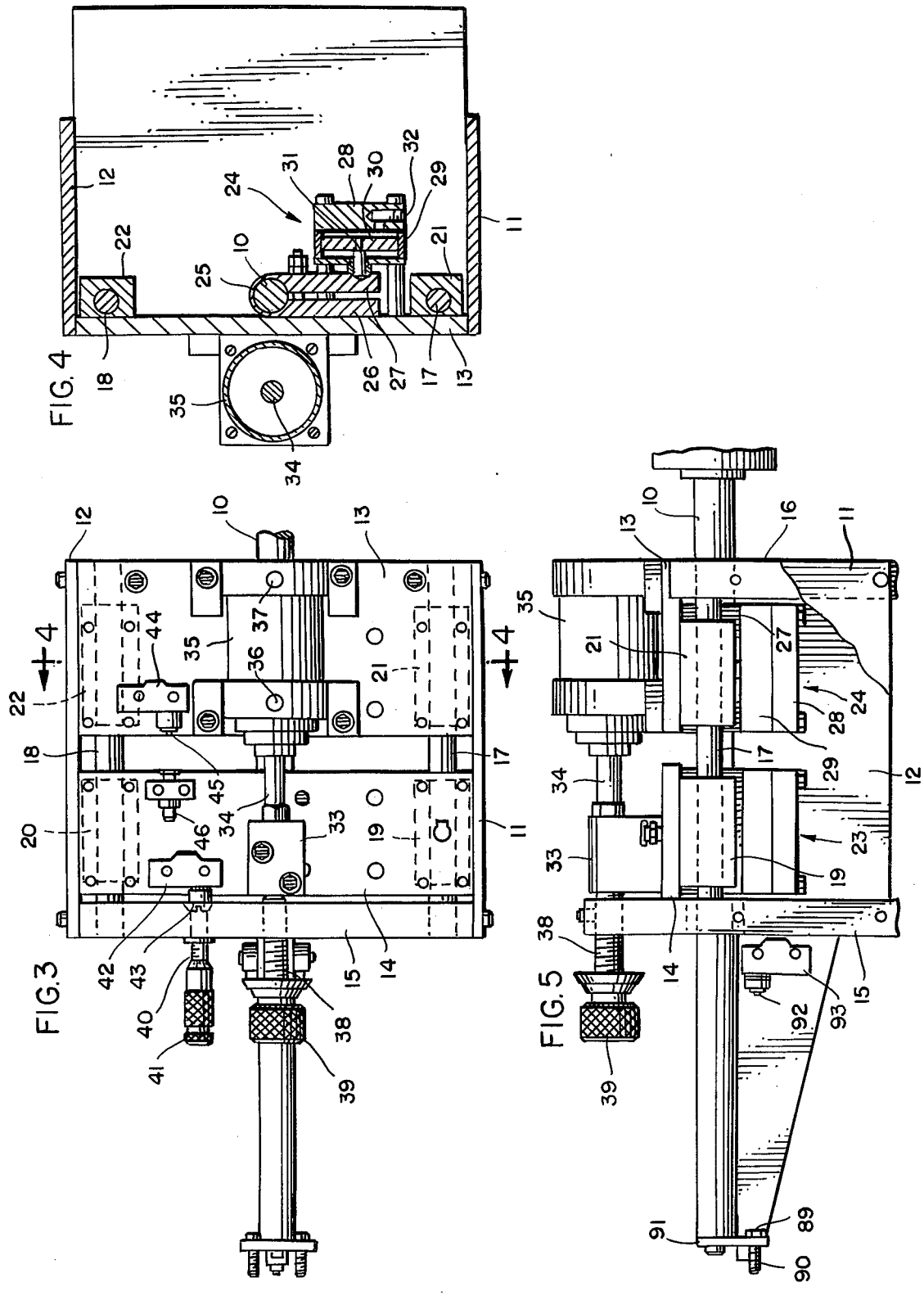

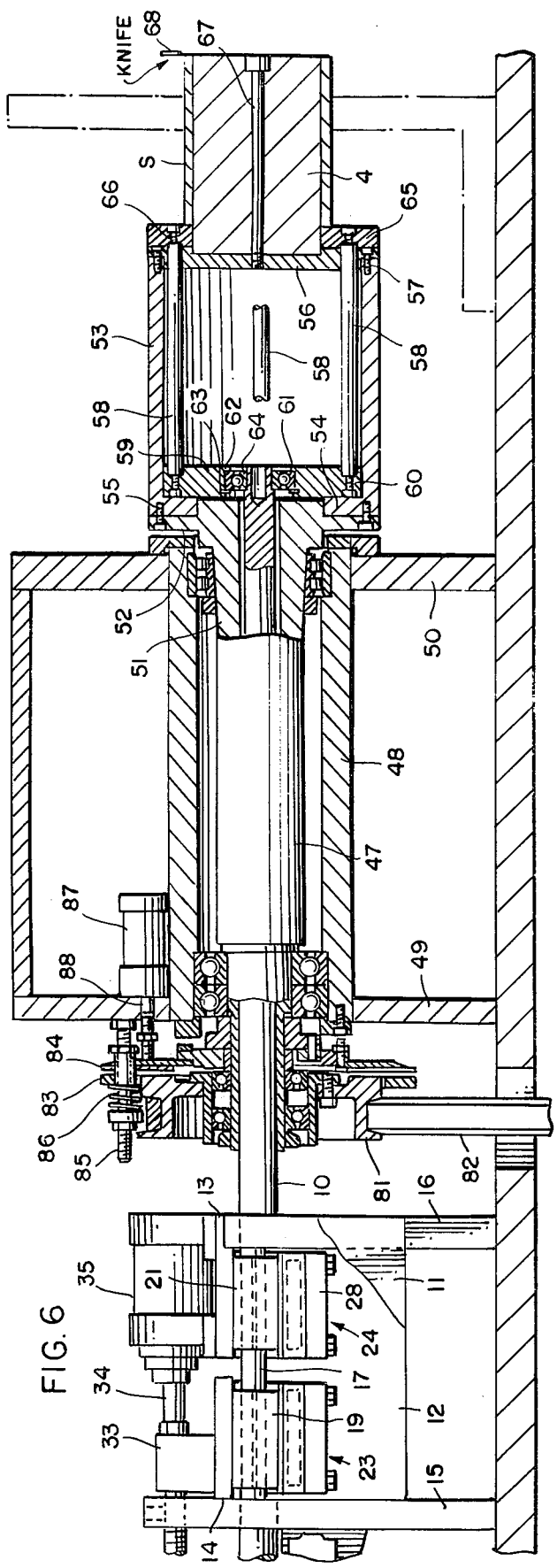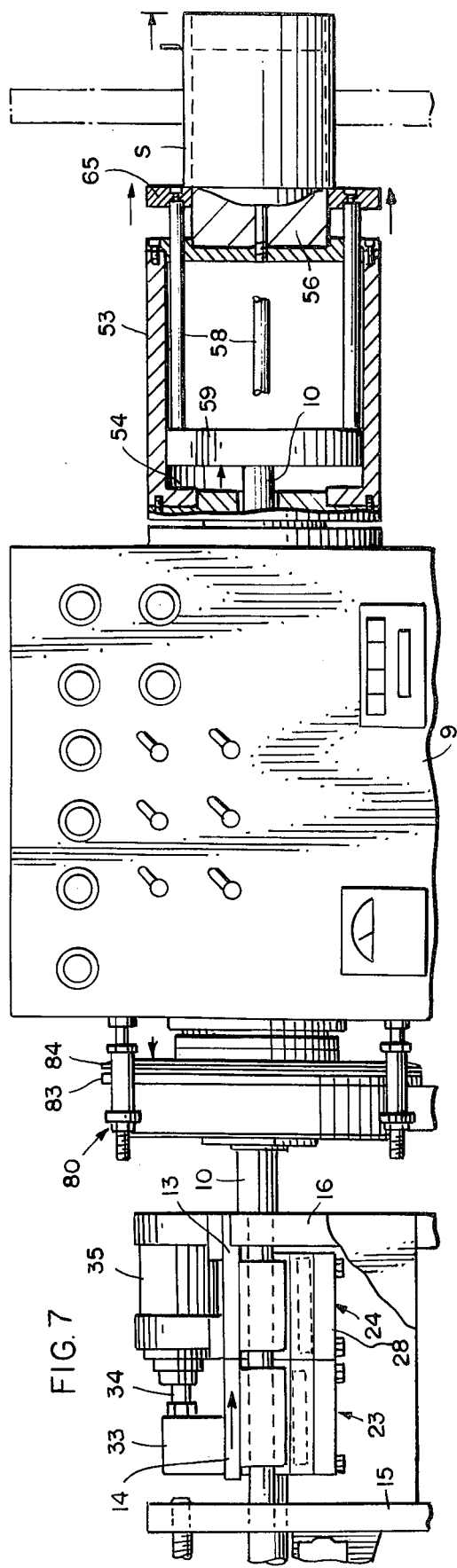

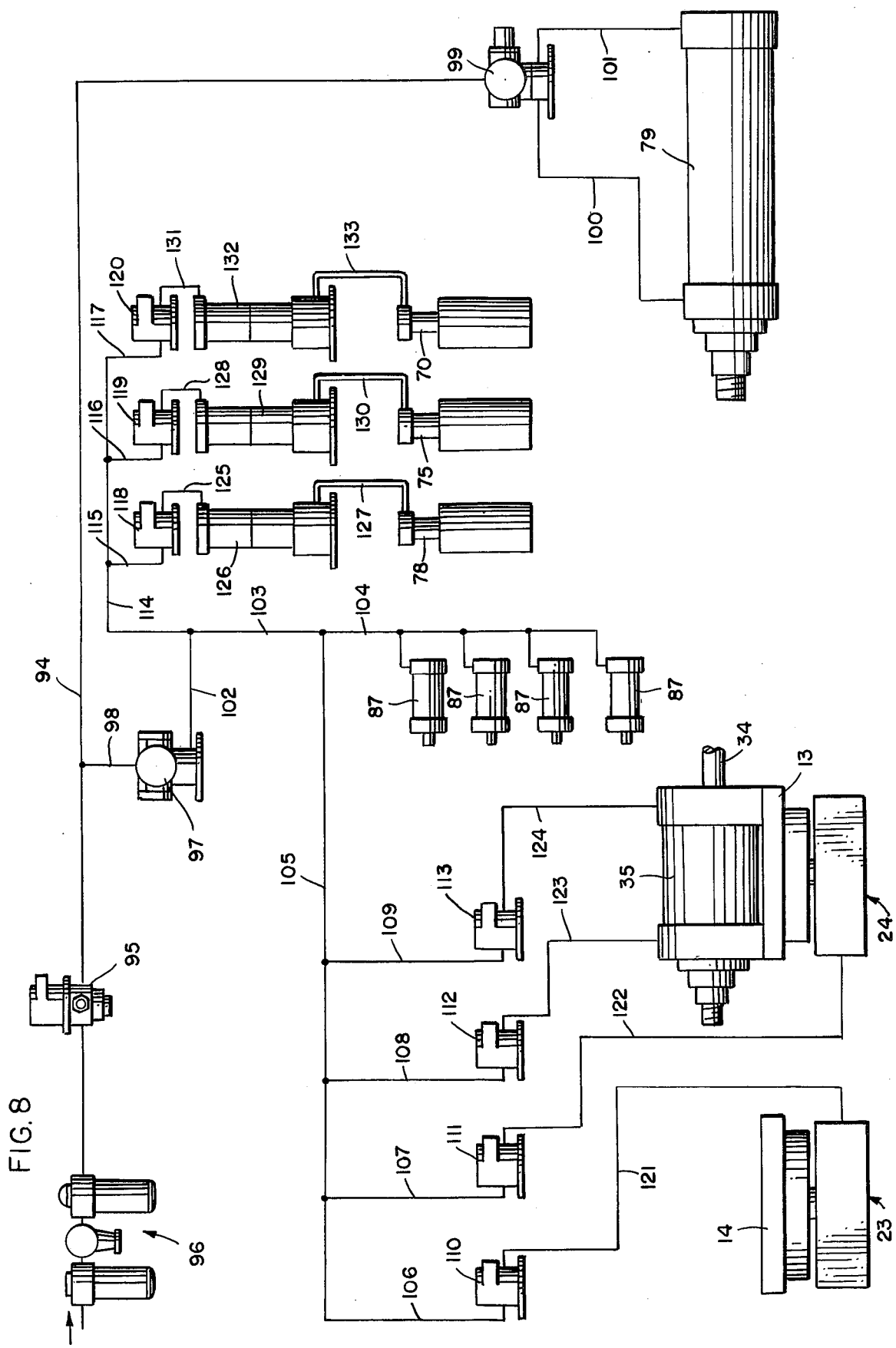

WASHER CUTTING MACHINE

BACKGROUND OF THE INVENTION

Flexible washers, formed of rubber or any suitable elastomeric plastic material and the like, are useful in many applications. They are used as lip seals in transmissions, for example, and should be flexible enough so that they can withstand high speeds, and yet prevent loss of oil. Square cut rings also constitute the basic element in power brakes.

Heretofore such washers have been made by a molding operation, which requires relatively little material, but has the disadvantage of requiring a relatively great mold time. Also in such a process it is difficult to make the washer uniform because of shrinkage. Furthermore, there is always a flashing which must be removed by trimming with a knife, and the pressure and temperature must be accurately controlled.

Washers also have been cut from pre-formed rubber sleeves, but they have been placed on urethane mandrels on which the cut ring remained until the entire sleeve had been cut. The problem with that arrangement was that the cut rings could not be cut to a width more than about three-eighth inch. They also had a tendency to "pile up" because of not being able to move off of the mandrel during subsequent cutting. Furthermore, the heat generated by the cutting operation would tend to burn the rubber.

All of these disadvantages have been overcome by the present invention where a sleeve of the desired material is molded or extruded, then placed on a mandrel, and rings are successively cut from the end of the sleeve extending beyond end of the mandrel thereby to form the washer. It has been found that the machine embodying the present invention is considerably faster and much more economical than machines and processes heretofore used.

BRIEF SUMMARY OF THE INVENTION

This invention relates in general to a machine for making washers from an elastomeric material. More specifically it relates to a machine for making such washers by cutting rings successively from one end of a sleeve formed of the desired material; the rings being of such width or thickness as to make them suitable for use as washers. The sleeve is placed on a mandrel with one end extending beyond the end of the mandrel a distance substantially equal to the width of the washer to be cut, whereupon a knife edge moves in and severs the ring from the sleeve whereupon it falls by gravity and the sleeve is then advanced on the mandrel for the next cut.

Means are also provided to cycle the machine automatically for each washer until the entire sleeve is cut into a plurality of such washers.

In view of the foregoing, it is the principal object of the present invention to provide a novel form of washer cutting machine which is extremely fast, has high production capabilities and is very economical compared to prior machines and methods for producing washers from an elastomeric material.

Another object is to provide a washer cutting machine wherein washers are formed by cutting rings successively from the end of a sleeve which protrudes beyond the end of a mandrel on which it is mounted.

A further object is to provide a washer cutting machine wherein the sleeve from which a washer is cut is automatically advanced along the mandrel after each ring is cut therefrom, thereby to position it in readiness for the next cut.

Still another and more specific object of the invention is to provide a washer cutting machine wherein a plurality of cutting tools may be mounted adjacent the end of the sleeve from which the washer is cut, thereby to perform additional cutting coperations on a washer to be cut therefrom, such as chamfering an edge or cutting a groove in the face or inside diameter thereof.

Other objects and purposes of the invention will appear more fully hereinafter as the description proceeds.

DESCRIPTION OF THE DRAWINGS

FIG. 1 is a framentary side elevational view of a washer cutting machine embodying the present invention;

FIG. 2 is an end elevational view of the machine shown in FIG. 1 looking toward the left thereof;

FIG. 3 is a top plan view on a somewhat enlarged scale of the indexing mechanism shown in elevation at the left hand end of FIG. 1;

FIG. 4 is a transverse sectional view taken substantially along the plane of line 4—4 of FIG. 3;

FIG. 5 is a side elevational view of the indexing mechanism of FIG. 3, but with the cover plate removed to show certain details;

FIG. 6 is a fragmentary vertical longitudinal sectional view through the machine of FIG. 1 on an enlarged scale and showing the indexing mechanism in retracted position;

FIG. 7 is a view similar to FIG. 6 but showing parts in elevation and showing the indexing mechanism in an advanced position where the elastomeric sleeve is in a position for a washer to be cut therefrom, and, FIG. 8 is a diagramatic illustration of the fluid control system which controls the sequence of operations of the machine.

DETAILED DESCRIPTION OF THE INVENTION

Referring now more particularly to the drawings, and especially to FIG. 1, the frame of the machine is indicated generally by the numeral 1. The primary parts of the machine include the indexing means for advancing the sleeve, which is indicated generally by the numeral 2. The actuating means for operating the indexing means is generally indicated by the numeral 3. The preformed sleeve of elastomeric material from which the rings are cut to form the washers is placed initially on a mandrel 4.

Cutting means are provided not only for cutting a ring from the end of the sleeve, but also additional cutting devices may be provided for performing other operations on the ring before it is cut from the sleeve, such as chamfering or forming grooves in the face or inner diameter of the washer. These various cutting devices are indicated in FIGS. 1 and 2 in general by the numeral 5. A clutch and brake assembly is indicated generally by the numeral 6 and, as will become apparent hereinafter, may comprise an arrangement whereby the brake is normally engaged and the clutch is normally disengaged. When the machine is started and power applied, the brake is disengaged and the clutch is engaged to rotate the mandrel with the sleeve thereon so that the advancing of the various cutting elements may take place to perform the various cutting operations.

The numeral 7 indicates in general a tailstock assembly which includes a cylinder and piston arrangement with a loading cup 8 at the outer end of the piston rod. Although a sleeve may, if desired, be placed on the mandrel 4 manually, nevertheless for safety reasons it is preferred that the sleeve be placed thereon automatically. The elastomeric sleeve is inserted in the loading cup 8 and the tailstock assembly activated so that the loading cup will move toward the mandrel and slide the sleeve thereon. After the sleeve has been placed on the mandrel the loading cup is retracted and the cycle may begin.

The numeral 9 indicates the control panel for the machine. Since this does not form any part of the present invention, there is no need for describing this control panel and the operation thereof in detail.

As mentioned briefly heretofore, one of the basic concepts of the present invention is the provision of indexing means which advances the sleeve on the mandrel at the end of each cutting operation. In other words, the sleeve is placed on the mandrel so that one end thereof extends beyond the end of the mandrel a distance substantially equal to the width of the ring to be cut to form the washer. After a ring has been cut from the end of the sleeve, the indexing means is actuated to move the sleeve or advance it, off of the mandrel a distance substantially equal to the width of the ring to be cut, whereupon the next cutting operation takes place. As will be seen hereinafter, these operations take place automatically.

A stripper rod 10 extends through the actuating means 3 and forms a part of the indexing means. As will appear more clearly hereinafter, the actuating means will advance the stripper rod 10 at the end of each cutting operation. The end of the stripper rod 10 is provided with suitable means which bear against the inner end of the elastomeric sleeve, so that when the stripper rod 10 is advanced, the sleeve will likewise be advanced the same distance.

Reference will now be made more particularly to FIGS. 3, 4 and 5 which illustrate in greater detail the actuating mechanism for the indexing means. These figures illustrate what may be termed a carriage assembly which comprises essentially a front cover plate 11, a rear cover plate 12, a stationary top plate 13, and a movable top plate 14. The carriage is also provided with an outer end plate 15 and an inner plate 16 which completes the framework of the carriage.

Guide rods 17 and 18 are mounted between the outer and inner plates 15 and 16 respectively, and the movable top plate 14 is guided by these rods in its reciprocating movement during the indexing operation.

A pair of bearing blocks 19 and 20 are mounted on the underside of the movable top plate 14, through which the guide rods 17 and 18 respectively pass. Similar bearing blocks 21 and 22 are mounted on the underside of the stationary top plate 13, and the guide rods 17 and 18 also pass through these blocks.

A pair of clamp members is provided for the purpose of advancing the stripper rod 10 for the indexing operation. Briefly described, a first or moving clamp member 23 mounted on the underside of the movable top plate 14, is caused to clamp the stripper rod 10 and to be moved toward the right as viewed in the various figures. This causes the stripper rod and sleeve to be advanced the thickness of the ring to be cut. After advancing the rod, this clamp member is released and returns to its retracted position.

A second or stationary clamp member 24 is mounted on the underside of the stationary plate 13, and is so arranged that it will clamp the stripper rod 10 and hold it in place while the first or moving clamp 23 returns to its retracted position. For the next indexing operation, the moving clamp 23 will clamp the stripper rod 10 to feed it or advance it forwardly during which time the stationary clamp will be released from the stripper rod.

Both the moving clamp member and the stationary clamp member, 23 and 24, are identical in construction and operation, and a description of one will suffice for both. The stationary clamp member 24 is illustrated in greater detail in FIG. 4, to which reference will now be made.

The body of the clamp member is indicated at 25, and it will be noted that the stripper rod 10 passes therethrough. The clamp member is provided with the two spaced legs 26 and 27 which are spaced apart, so that when pressure is applied to one of the legs the stripper rod will be clamped therebetween. The leg 26 of the clamp member is mounted on the underside of the stationary top plate 13, while the other leg 27 thereof is adapted to be moved. The normal tension set up when the movable leg is moved to clamping position, will be sufficient to return the leg to its unclamped or released position upon release of the pressure.

Both clamp members are designed for operation by air or other suitable fluid under pressure. Thus, a support plate 28 is provided on which the cylinder 29 is mounted, and within which a piston 30 is mounted for reciprocation. The piston 30 is provided with a piston rod 31 which is received in a recess in the outer surface of the leg 27 of the clamp member, so that when the piston and piston rod are moved toward the left under pressure, as viewed in FIG. 4, the clamp member will be moved to its clamping position.

The support plate 28 is provided with an air inlet opening 32, which is formed to direct air to one side of the piston 30. Suitable valving is provided so that air or fluid pressure in the system will be admitted through the opening 32 at the proper time so that the piston and piston rod 30 and 31 will move the clamp member to clamping position. Also at the proper time in the cycle, the valving will be such that the air pressure will be vented, whereupon the clamp member will be released.

As stated above, both of the clamp members which are generally indicated by the numerals 23 and 24 are identical in construction. It will thus be evident that, at the end of a cutting operation, the clamp member 23 will be clamped to the stripper rod 10 while the clamp member 24 will be released. As will appear presently, suitable means are provided to move the clamp member 23 and the stripper rod 10 toward the right as viewed in the various figures, to an advanced position thereof, which will thereupon advance the elastomeric sleeve on the mandrel to the next successive position for cutting a washer from the end thereof.

The actuating means for operating the indexing means also includes the block 33 which is mounted upon the movable top plate 14. A piston rod 34 is secured to the block 33, and this rod is connected to a piston within the cylinder 35 mounted upon the stationary top plate 13. 36 and 37 are openings into the cylinder 35 for the passage of air or other suitable fluid under pressure. When such fluid enters the opening 36 the piston rod and the block 33, together with the movable top plate 14, and all of the elements secured thereto, will move toward the right. If the clamp member 23 has been actuated to clamp the stripper rod 10, then movement of the piston rod 34 toward the right will also carry the stripper rod 10 to advance the sleeve from which the washers are cut.

Fluid under pressure entering the opening 37 will move the piston rod 34 and the plate 14, together with all elements mounted thereon, to the retracted position thereof toward the left. After an indexing operation has been completed by advancing the stripper rod 10, not only is air admitted to the opening 37, but also the clamp member 24 is clamped upon the rod, and the clamp member 23 is released therefrom, so that the stripper rod 10 will remain in its advanced position while the clamp member 23 and other elements associated therewith return to their retracted position.

An adjustable stop screw 38 is provided which is threadedly engaged in an opening in the outer plate 15. This screw may be manually adjusted by turning the knob 39 thereon so that the opposite end thereof will be in the path of movement of the block 33 when it is moved to its retracted position. Thus, the distance through which the stripper rod 10 is advanced may be controlled by this screw 38 and the micrometer screw 40. This micrometer is utilized for a fine adjustment by rotating the micrometer head 41.

A limit switch 42 is mounted on the movable top plate 14 and is provided with a switch arm 43 thereon which, when the plate is moved to its retracted position, will come against the end of the micrometer adjusting screw 40. When this occurs the limit switch 42 will actuate suitable valving in the fluid system so that air will then be directed through the opening 36 into the cylinder 35 and to the clamp member 23 so that the stripper rod 10 will be advanced.

Another limit switch 44 is mounted upon the stationary top plate 13 and is provided with a switch arm 45. When the movable plate 14 advances the various elements above described by moving toward the right, the end of the adjusting screw 46 will come against the switch arm 45 thereby to operate suitable valving in the fluid system, to release the clamp member 23 and actuate the clamp member 24, as well as to admit air to the opening 37, whereupon the movable top plate 14 and all of the elements associated therewith will be returned to its retracted position.

It will thus become evident at this point, that the thickness of the rings to be cut from the end of the sleeve may be very accurately controlled. The distance through which the stripper rod 10 may be advanced is controlled by the adjustable stop screw 38 and the micrometer adjustment 40. The farther toward the right these elements are adjusted, the less will be the distance through which the plate 14 and the elements mounted thereon may be moved. Thus, the indexing mechanism may be adjusted so that very thin rings may be cut from the end of the sleeve, or relatively thick rings may be cut therefrom.

The details of the indexing mechanism which is operated by the actuating means just described, may be more clearly understood by reference to FIGS. 6 and 7. It will here be noted that the stripper rod 10 extends toward the right from the actuating means described above through an elongated hollow spindle 47 mounted for rotation within a housing 48. This housing is suitably mounted between the end plates 49 and 50. The outer end of the spindle 47 has a taper thereon and may be identified as the spindle nose 51. The spindle nose has adjacent the outer end thereof an annular flange 52.

A cylinder 53 is provided with an inwardly extending annular flange 4 at the inner end thereof and abuts against the annular flange 52 on the spindle nose, and is secured thereto by a plurality of screws 55. Adjacent the outer end of the cylinder 53 there is provided a stripper plate 56 which is secured to the outer end of the cylinder 53 by means of a plurality of screws 57.

A plurality of rods 58 extends between an inner end plate 59 and through the stripper plate 56. A plurality of screws 60 extend into the end plate 59 and the inner ends of the rods 58, thereby securing the rods thereto. When the spindle 47 rotates it will carry with it the inner end plate 59 which has mounted in a central opening therein an outer bearing race 61. This bearing race 61 is held against axial movement by abutting against an annular shoulder 62 on one side thereof and a retaining ring 63 on the other side.

The inner bearing race 64 is mounted upon the outer end of the stripper rod 10 which has axial movement only and does not rotate. At the outer end of the cylinder 53 there is provided a stripper ring 65 into which the outer ends of the rods 58 extend. This stripper ring then is secured to the plurality of rods 58 by means of a plurality of screws 66 which pass through the ring 65 and into the ends of the rods 58.

It will thus be evident that when the spindle 47 is caused to rotate, it will carry with it the cylinder 53, the inner end plate 59, the rods 58, the stripper plate 56, and the stripper ring 65.

Mandrel 4 is mounted at the outer end of the chuck so that the inner end thereof is received in a recess in the outer face of the stripper plate 56. The mandrel is secured to the stripper plate 56 by means of an elongated screw 67 which extends through a central opening in the mandrel and has its inner end threaded for engagement with a threaded opening in the center of the stripper plate 56. The elastomeric sleeve is indicated by the letter S and is shown in FIG. 6 as mounted on the mandrel. It will be evident at this point that the mandrel 4 and sleeve S will rotate with the spindle 47 and the cylinder 53.

As pointed out above, the stripper rod 10 does not rotate, but it is mounted only for axial movement. By reference to FIGS. 6 and 7 it will be evident that when the stripper rod 10 is advanced toward the right when the actuating means described above is operated to perform the indexing operation, the various parts mounted on the outer end of the stripper rod will also be advanced. The inner end plate 59 is mounted for sliding movement within the cylinder 53, as well as for rotation therewith. When the stripper rod 10 is advanced it carries with it the inner end plate 59 as well as the stripper plate 56 to which the end plate 59 is connected by means of the plurality of rods 58. The stripper ring 65 is also mounted on the rods 58 and will be advanced with the stripper rod 10.

It will be noted in FIG. 6 that the stripper ring 65 has an opening in the center thereof of substantially the same diameter as the diameter of the mandrel 4, so that when the sleeve S is mounted on the mandrel, the inner end of the sleeve will abut against the stripper ring 65. Thus, each time the stripper rod 10 is advanced, it also advances the sleeve S so that the outer end thereof will extend beyond the outer end of the mandrel a predetermined distance.

The cutting knife or cutting edge 68 is mounted for radial movement inwardly to cut a ring from the outer end of the sleeve S as it is rotating. The positioning of the knife edge 68 is not particularly critical, except that it should be as closely as possible in alignment with the outer end of the mandrel. Thus, when the indexing operation takes place by advancing the stripper rod 10 to move the sleeve S toward the right as shown in FIG. 7, the knife edge 68 will be moved radially inwardly to cut from the outer end of the sleeve a ring which is substantially equal in width to the distance through which the sleeve has been advanced, thereby to form the desired washer.

Referring to FIG. 2 for the moment, the knife 68 is shown as being mounted upon a slide member 69. The construction and operation of the knife is well known to those skilled in this art, and it is therefore sufficient to note primarily that the slide 69 is mounted for reciprocating movement in suitable guideways and is advanced and retracted by means of an air operated hydraulic pump, wherein hydraulic fluid in the cylinder 70 is forced by air to move the piston 71 to which the slide 69 is secured. Thus, by suitable valving, the knife is caused to advance at the end of each indexing operation, and to be retracted at the end of each cutting operation.

It may also be well to mention at this time some of the other operations which may be performed upon a ring to be cut from the sleeve and formed into a washer. Depending upon the use to which the washer is to be put, it may be desirable to have one of the external or internal edges thereof chamfered, or it may be desirable to provide for a groove either in the outer face of the washer, or around the inner circumference thereof. It is therefore possible to mount on the machine, for example on the end plate 72, and at suitable locations thereon, a plurality of additional cutting members having a similar operation and construction to that heretofore described with respect to the knife assembly for severing the ring from the sleeve.

A cutting assembly generally indicated by the numeral 73 might be mounted on the end plate 72 and have a knife edge (not shown) mounted on the outer end of a slide 74 actuated to advanced and retracted positions by air hydraulic means acting through the cylinder 75. A similar arrangement of another cutting assembly shown generally at 76 can be provided wherein another cutting member (not shown) may be mounted on a slide 77 and actuated to advanced and retracted positions by air hydraulic means acting through the cylinder 78.

All of these cutting members operate on suitable timers. For example, if the first cutting operation is to be performed by the knife on the assembly 73, the knife will be advanced and then retracted by operation of a timer, and when the slide moves to its retracted position it will actuate a limit switch which will then cause the cutting assembly 76 to be operated. The slide 77 will then be operated to perform its cutting operation, whereupon when such operation has been completed and the slide retracted, the final cutting operation involving the knife 68 will take place to sever the ring from the sleeve and thus complete the washer.

After completion of the final cutting operation of a washer, the slide 69 will be caused to retract and at the end of its stroke it will operate a limit switch which controls the valves admitting air or other fluid under pressure to the clamp member 23 and to the opening 36 in cylinder 35, whereupon the moving clamp 23 and stripper rod 10 will be advanced to perform another indexing operation and advance the sleeve for the next cutting operation. As mentioned above, when the stripper rod and its associated elements have been advanced the predetermined set distance, the operating screw 46 will contact the switch arm 45, thereby to switch the various valves to release the clamp member 23 and apply the clamp member 24 and to return the top plate 14 and all of the elements attached thereto to its retracted position.

The sleeve S may be placed on the mandrel 4 by hand, but for safety reasons, it is preferred that this operation be performed automatically. For this reason the loading cup 8 is provided on the outer end of a piston rod in the cylinder 79 of the tailstock 7. It will be noted from viewing FIG. 1 that the outer face of the loading cup 8 is recessed and is adapted to receive therein one end of the sleeve S. When the machine is first operated, two start buttons must be depressed, whereupon the air valve controlling the piston and piston rod of the cylinder 79 will be operated to introduce air under pressure into the cylinder to advance the loading cup 8 and the sleeve therein to a forward position where the sleeve is forced onto the mandrel 4. When the two start buttons are released, the air valve will be vented and the loading cup retracted to its initial position shown in FIG. 1.

The sleeve will have an interference fit on the mandrel, and this will depend upon the material from which the sleeve is formed. If, for example, the material is relatively weak, it will be necessary to stretch it a greater amount so that it will have a snug fit on the mandrel. If, however, the material is relatively strong, it will be necessary to stretch it only a relatively small amount to still have the tight fit necessary to prevent relative rotation between the sleeve and the mandrel. A plastic material, for example, may need to be stretched only 0.004 or 0.005 inch. On the other hand, if a relatively weak material such as rubber is the material from which the sleeve is formed, then it may need to be stretched as much as 0.030 inch.

The main drive means for the machine includes a clutch and brake assembly generally indicated by the numeral 80. This may be viewed in FIGS. 6 and 7, wherein this assembly is shown in elevation in FIG. 7, and in section in FIG. 6. This clutch and brake assembly has a well known construction, and is preferably of the type wherein the brake is normally engaged by spring pressure, and the clutch is normally disengaged. Air or other fluid under pressure is applied to engage the clutch and simultaneously disengage the brake. Since this construction is known, it is necessary here only to refer to the individual parts in general.

Referring to FIG. 6 it will be seen that a clutch disc and pulley 81 is keyed to the spindle 47. The clutch disc and pulley 81 is rotated or driven by a motor (not shown) by means of the belt 82. The assembly includes a brake plate 83 and a disc 84. There is also provided a plurality of brake cylinders 87 each of which has associated therewith an actuating piston 88. When air or other fluid under pressure is admitted to the cylinder 87 the pistons 88 will be moved outwardly to engage the clutch and disengage the brake. At this point the spindle 47 and all of the elements associated therewith will begin to rotate.

To briefly review the operation of the machine before referring to the pneumatic circuitry of FIG. 8, the elastomeric sleeve is first applied to the mandrel 4 by first placing the sleeve in the loading cup 8 and then pressing the two start buttons, whereupon the cup 8 and sleeve thereon will be advanced to the mandrel. Whether the sleeve is placed completely on the mandrel initially is a matter of choice. The sleeve, for example, can be the same length as the mandrel, or slightly longer, or slightly shorter. In some instances it may be desirable to have the sleeve somewhat longer than the mandrel in the first instance so that an initial cut may be made to be sure that the end of the sleeve is smooth. The machine then is initially started with the motor running and with the brake engaged and the clutch disengaged. The control for the air valves is then initially operated to apply air under pressure to the system. Either a cut may be made first or an indexing step may be performed. This will be at the discretion of the machine operator. The valving in the system is then controlled so that the moving clamp member 23 will be actuated to close upon the stripper rod 10, and the stationary clamp member 24 will be released therefrom. Air will be admitted to the cylinder 35 thereupon to move the piston rod 34 and movable plate 14 to an advanced position which will thereupon carry with it stripper rod 10 and all of the elements heretofore described which are associated therewith at the outer end thereof, and which then advances the stripper ring 65 to advance the sleeve to a position so that its outer end is beyond the mandrel 4 and ready for a cut to take place.

Upon completion of the cut and retraction of the knife 68 to its fully retracted position, a suitable limit switch is actuated to cause the valving in the system to be operated to repeat the indexing step. In the meantime, as soon as the indexing step has been performed, the advancing movement of the movable plate 14 with the adjustable screw 46 thereon will actuate the switch arm 45 to cause the air valves in the system to clamp the member 24 upon the stripper rod 10 and to release the clamp member 23 therefrom. At the same time air under pressure will be admitted to the forward end of the cylinder 35, whereupon the piston rod 34, plate 14, and clamping member 23 will be retracted while the stripper rod 10 remains in its advanced position.

It should also be noted here that it is preferable for a limit switch to be provided in association with the tailstock assembly, so that when the loading cup 8 has been retracted after loading a sleeve onto the mandrel, it will be actuated to admit air to the various cylinders 87, thereby to engage the clutch and begin rotation of the spindle and its associated elements.

This cyclical operation continues until the last ring has been cut from the inner end of the sleeve. At this point, the stripper rod 10 will have been advanced in a step-by-step fashion toward the right until the head 89 on the adjustable stop bolt 90 comes against the switch arm 92 of limit switch 93. At this point such switch operates to relieve the air pressure in the brake cylinders 87, whereupon the clutch will be disengaged and the brake engaged to stop operation of the machine. At this point, the spindle 47 and the chuck at the outer end thereof will have been advanced to its farthest position toward the right. When the next sleeve is applied to the mandrel, the force is such that the chuck, including all of the parts associated therewith, including the stripper rod 10, will be pushed to its retracted position and recocked, so to speak, in readiness for the next series of cutting operations to be performed. Referring now more particularly to the pneumatic diagram shown in FIG. 8, the main air line is indicated at 94 and this extends from the "air-on" valve 95. In advance of that there is the regulator and lubricating unit generally indicated at 96. When this air-on valve 95 is opened, air under pressure will be admitted through the line 94 and into the cycle control valve 97 by means of the branch air line 98.

The air in line 94 will also be carried to the tailstock valve 99 which is normally opened through the line 100 to carry fluid pressure to the forward end of the tailstock cylinder 79 which maintains the loading cup in its retracted position. Upon actuation of the two start buttons, the valve 99 will be shifted to direct air through line 101 to the rear end of the cylinder 79, thereby to move the loading cup to its advanced position and place the sleeve upon the mandrel.

At the completion of this stroke, the two start buttons may be released, whereupon the valve 99 will again be shifted to direct air through line 100 into the forward end of the cylinder 79, thereupon causing the loading cup to be retraced. Upon retraction of the loading cup and the piston rod on which it is mounted, a limit switch is activated which opens the cycle control valve 97. Opening of this valve will direct air from the control valve through line 102 and from there through line 103 and 104 to each of the brake cylinders 87, thereupon to urge each of the piston rods associated therewith in a direction to engage the clutch and disengage the brake, thereupon starting rotation of the spindle and all of the elements associated therewith, including the mandrel and the elastomeric sleeve thereon.

At this time air is also directed through line 105 and the branch lines 106, 107, 108 and 109 to the control valves 110, 111, 112, and 113 respectively.

Also from the air line 102 air will be directed through the line 114 and the branch lines 115, 116 and 117 to the air valves 118, 119 and 120 respectively.

At this point nothing will happen because all of the air valves just identified will be closed. Valve 110 is connected through line 121 to the movable clamp member 23. Valve 111 is connected through line 122 to the stationary clamp member 24. Valve 112 is connected through line 123 to one end of the cylinder 35 to admit air through the opening 36 therein, and valve 113 is connected through line 124 to the opposite end of the cylinder 35 to admit air through the opening 37 therein.

The air valve 118 is connected through line 125 to the air hydraulic pump 126 which, in turn, is connected through conduit 127 to one of the slide members on which is mounted a cutting knife. For purposes of illustration it may be considered that the conduit 127 leads to the cylinder 78 for performing one of the cutting operations.

Air valve 119 is connected through line 128 to the air hydraulic pump 129 which, in turn, is connected through the conduit 130 to the cylinder 75. The air valve 120 is connected through line 131 to the air hydraulic pump 132 which, in turn is connected through conduit 133 to the cylinder 70. In FIG. 2 cylinder 70 is the one which actuates the slide which has the cutting knife 68 thereon. It will be understood, of course, that only one of these cutting knives will be actuated if no additional cutting steps are to be performed upon the washer. Likewise, only two may be used, or all three.

The controls for operating the various valves are mounted on the control panel 9. With the air pressure in each of the valves 110, 111, 112, 113, 118, 119 and 120, and the spindle rotating with the sleeve on the mandrel, the machine is ready to begin its cycle. If the sleeve needs to be advanced one step or more before a ring can be cut therefrom, then a suitable control is manually operated to clamp the movable clamp member 23 and direct air into cylinder 35 through line 123 to advance the stripper rod and stripper plate for advancing the sleeve. On the other hand, if the sleeve is placed on the mandrel so that the outer and thereof extends beyond the end of the mandrel, then the first operation would be to operate a control to open one of the valves 118, 119 or 120 to cause a cutting operation to be performed.

With all of the controls in their proper positions, and assuming that the first operation is to be to index and advance the sleeve, the valve 110 will be shifted to direct air through line 121 into the cylinder 29 (see FIG. 4) to activate the movable clamp 23 to grip the stripper rod 10. The stationary clamp member 24 will be released so that the stripper rod 10 may move with respect thereto. Simultaneously the air valve 112 will be opened to direct air through line 123 to the opening 36 into one end of the cylinder 35, whereupon the piston rod 34 will be advanced toward the right carrying with it the movable plate 14, the clamp member 23 and the stripper rod 10. When these elements have reached their advanced position where the switch arm 45 of limit switch 44 is activated, valve 110 will be shifted to relieve the air pressure in line 121 and release the clamp member 23. At the same time valve 111 will be shifted to direct air through line 122 to the stationary clamp member 24, which will thereupon grip the rod 10 and prevent it from axial movement in either direction.

At the same time valve 112 will be shifted to relieve the pressure in line 123, and valve 113 will be shifted to direct air under pressure through line 124 to the opening 37 in the opposite end of the cylinder 35. This then will retract the movable plate 14 and the clamp member 23 to its initial position in readiness for actuating the next subsequent indexing operation.

As soon as the indexing step has been performed and the sleeve is positioned so that the outer end thereof extends a predetermined distance beyond the end of the mandrel, the various cutting operations and severing of the ring from the sleeve will take place automatically. As mentioned above, these cutters are timed, so that as soon as the sleeve is properly positioned, a cutting operation will take place, and if there are to be three cutting operations, the valve 118 is shifted to direct air through line 125 into the air hydraulic pump 126 where the hydraulic fluid therein is thereupon directed through conduit 127 to advance the knife through movement of the slide on which it is mounted. Upon retraction of this slide valve 119 will be shifted and air will again be directed against the fluid in air hydraulic pump 129 so that it will be delivered through conduit 130 to cylinder 75, thereby to advance the knife for the second cutting operation. Finally, upon retraction of the slide carrying the second knife, the valve 120 will be shifted to direct air through line 131 and against the fluid in air hydraulic pump 132, whereupon it will be delivered under pressure through conduit 133 to cylinder 70 thereby to advance the knife 68 for the final cutting operation.

When the slide on which the knife 68 is retracted a limit switch is activated which begins the cycle again. The cycle is repeated successively as soon as each successive ring has been cut from the outer end of the sleeve. It continues until the final ring is cut, at which time the arm 92 of limit switch 93 will be actuated to shift the cycle control valve 97 to relieve the air pressure from the brake cylinders 87 whereupon the springs 86 will take over to engage the brake and disengage the clutch, thereby stopping all operation of the machine until a new sleeve has been placed upon the mandrel.

From the foregoing description it will be apparent that we have designed an improved machine and method for cutting rings from an elastomeric sleeve for use as washers. It has been found in actual practice that the machine is extremely fast and produces washers more economically and at a far greater rate than machines which have been used for this purpose in the past. It has overcome all of the disadvantages enumerated above which have been encountered with previous machines.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

We claim:

1. A machine for cutting a plurality of washers, or the like, successively from a sleeve of suitable elastomeric material, comprising,
   a. a rotatable mandrel adapted to receive and to hold the sleeve thereon, said mandrel being unsupported at the outer end thereof,
   b. indexing means for advancing the sleeve on said mandrel a distance substantially equal to the thickness of a washer to be cut therefrom, said indexing means including
      1. a non-rotatable elongated stripper rod mounted for movement in an axial direction, and
      2. a rotatable stripper ring at one end of said rod movable in an axial direction therewith,
      3. said ring being in abutting engagement with the inner end of the sleeve, whereby advancement of said rod and ring will advance the sleeve,
   c. cutting means operable to cut a ring of a predetermined width from the outer end of the sleeve beyond the end of said mandrel,
   d. means for rotating said mandrel and sleeve, and
   e. actuating means for operating said indexing means upon completion of a cutting operation.

2. A machine as defined in claim 1, including means for causing said actuating means to become operable automatically after completion of said cutting operation.

3. A machine as defined in claim 1, including adjustment means for regulating the distance through which said indexing means advances the sleeve when operated by said actuating means.

4. A machine as defined in claim 1, including means for automatically stopping operation of the machine upon completing the cut of the final ring from the sleeve.

5. A machine as defined in claim 1, wherein said cutting means includes a knife-edge movable in a generally radial direction between a retracted position away from the sleeve, and an advanced cutting position, and means to advance and retract said knife-edge after the sleeve has been advanced by said indexing means.

6. A machine as defined in claim 2, wherein said cutting means includes a knife-edge movable in a generally radial direction between a retracted position away from the sleeve, and an advanced cutting position, and wherein said last named means is operable in response to movement of said knife-edge to the retracted position thereof.

7. A machine as defined in claim 1, wherein said cutting means includes a knife-edge reciprocable between an advanced position to cut the sleeve, and a retracted position, and means operable in response to movement thereof to the retracted position to cause said actuating means to become activated to operate said indexing means.

8. A machine as defined in claim 1, wherein said actuating means includes a movable clamp member and a stationary clamp member both adapted to grip said rod, means for activating said movable clamp member and releasing said stationary clamp member, and means for moving said movable clamp member with the rod gripped thereby, to advance said rod and index the sleeve.

9. A machine as defined in claim 1, including means operable in response to the advancement of said indexing means to advance said cutting means to sever a ring from the sleeve.

10. A machine as defined in claim 1, including loading means for automatically placing a sleeve on said mandrel.

11. A machine as defined in claim 1, including drive means for rotating said mandrel and sleeve comprising a clutch and brake assembly wherein the clutch is engaged and the brake is disengaged during operation of the machine, and means operable in response to movement of said indexing means to the most advanced position thereof to disengage said clutch and engage said brake to stop operation of the machine.

12. A machine for cutting a plurality of washers, or the like, successively from a sleeve of suitable elastomeric material, comprising,
   a. a rotatable mandrel adapted to receive and to hold a sleeve thereon, said mandrel being unsupported at the outer end thereof,
   b. indexing means for advancing the sleeve on said mandrel a distance substantially equal to the thickness of a ring to be cut therefrom,
   c. cutting means operable to cut a ring of a predetermined width from the outer end of the sleeve,
   d. means for rotating said mandrel and sleeve,
   e. actuating means for operating said indexing means upon completion of a cutting operation,
   f. sleeve loading means reciprocable between a retracted position and an advanced position for loading a sleeve on said mandrel, and
   g. means operable in response to retraction of said loading means to activate said mandrel rotating means.

13. A machine for cutting a plurality of washers or the like, successively from a sleeve of suitable elastomeric material, comprising,
   a. a rotatable mandrel adapted to receive and to hold the sleeve thereon,
   b. indexing means for advancing the sleeve on said mandrel a distance substantially equal to the thickness of a washer to be cut therefrom, including
      1. an elongated stripper rod mounted for movement in an axial direction, and
      2. means mounted adjacent one end of said stripper rod adapted to abut against the inner end of the sleeve, thereby to advance the sleeve when said rod is advanced,
   c. cutting means operable to cut a ring of a predetermined width from the outer end of the sleeve,
   d. means for rotating said mandrel and sleeve, and
   e. actuating means for advancing said stripper rod upon completion of a cutting operation, including
      1. first and second clamp members associated with said stripper rod, each adapted to clamp said rod and to be released therefrom,
      2. means operable to clamp one of said clamp members to said rod and advance the rod the width of a ring to be cut while the other of said clamp members is released from said rod, and
      3. means operable to clamp the other of said clamp members to said rod while said one clamp member is released therefrom and retracted.

14. A machine for cutting a plurality of washers, or the like successively from a sleeve of suitable elastomeric material, comprising,
   a. a rotatable mandrel adapted to receive and to hold the sleeve thereon,
   b. indexing means for advancing the sleeve on said mandrel a distance substantially equal to the thickness of a washer to be cut therefrom,
   c. cutting means operable to cut a ring of a predetermined width from the outer end of the sleeve,
   d. means for rotating said mandrel and sleeve, including
      1. a clutch and brake assembly wherein the clutch is engaged and the brake is disengaged during operation of the machine and,
      2. means operable in response to movement of said indexing means to the most advanced position thereof to disengage said clutch and engage said brake to stop operation of the machine,
   e. actuating means for operating said indexing means upon completion of a cutting operation,
   f. loading means reciprocable between a retracted position and an advanced position for loading a sleeve on said mandrel, and
   g. means operable in response to retraction of said loading means to cause said clutch to be engaged and said brake to be disengaged for rotating said mandrel and sleeve.

* * * * *